United States Patent [19]

Onozato

[11] Patent Number: 5,250,957
[45] Date of Patent: Oct. 5, 1993

[54] METHOD OF DETECTING AN INK RESIDUAL QUANTITY IN AN INK JET PRINTER

[75] Inventor: Takashi Onozato, Morioka, Japan

[73] Assignee: Alps Electric Co., Ltd., Tokyo, Japan

[21] Appl. No.: 911,437

[22] Filed: Jul. 10, 1992

[30] Foreign Application Priority Data

Jul. 29, 1991 [JP] Japan .................................. 3-188881

[51] Int. Cl.⁵ ............................................. G01D 15/16
[52] U.S. Cl. .................................. 346/1.1; 346/140 R
[58] Field of Search ............................. 346/140 R, 1.1

[56] References Cited

U.S. PATENT DOCUMENTS 5,136,309 8/1992 Iida et al. ........................ 346/140 R

FOREIGN PATENT DOCUMENTS 60-99672 5/1985 Japan .
0015415 1/1987 Japan .
0259861 11/1987 Japan .............................. 346/140 R Primary Examiner—Benjamin R. Fuller
Assistant Examiner—David Yockey
Attorney, Agent, or Firm—Guy W. Shoup; David W. Heid

[57] ABSTRACT

A method of detecting an ink residual quantity in an ink jet printer, which is capable of eliminating a possibility of blank printing even when effecting a print on the large-sized paper by detecting the ink residual quantity at a high frequency and of keeping a good printing efficiency. The ink residual quantity is detected in an equispeed motion area of the carriage. The ink residual quantity can be stably detected per line without stopping the carriage and providing a special liquid level oscillation preventive mechanism.

6 Claims, 4 Drawing Sheets

METHOD OF DETECTING AN INK RESIDUAL QUANTITY IN AN INK JET PRINTER

BACKGROUND OF THE INVENTION

1. Field of the Invention

The present invention relates generally to a method of detecting an ink residual quantity in an ink jet printer and, more particularly, to a method of detecting an ink residual quantity in an ink jet printer having a reciprocating carriage mounted with an ink jet head and an ink tank.

2. Related Background Art

There are a variety of methods in ink jet printers. In any method, generally, a residual quantity of the ink within an ink tank is detected, and the user is warned of an ink exhaustion.

The above-described method of detecting an ink residual quantity includes those of detecting an electric resistance value of the ink and optically detecting an ink liquid level. Herein, there arise the following problems inherent in the ink jet printer of such a type that a carriage mounted with the ink tank is reciprocated together with an ink jet head. Ink oscillations are caused because of the acceleration acting on the ink tank mounted on the carriage during bilateral turnabouts of the carriage. In this state, the ink residual quantity can not be accurately detected by any method.

Hence, this type of ink jet printer has hitherto involved the step of detecting the ink residual quantity by setting the carriage in a home position after performing one-page printing or detecting the ink residual quantity by stopping the carriage similarly in the home position for a short period of time after performing the one-page printing.

Further, some printers incorporate the liquid level oscillation preventive mechanism having a complicated structure so as not to cause the oscillations of the liquid level to prevent a sway of the ink.

The foregoing method of detecting the ink residual quantity per page presents such a big problem that the ink is consumed up during printing when the page size is as large as A1 or A2.

In addition, the method of detecting the ink residual quantity by stopping the carriage for the short time per line causes a problem wherein an accumulating total of the stop time exerts an influence on a printing efficiency as a loss of printing speed if the number of printing lines is large.

SUMMARY OF THE INVENTION

It is a general object of the present invention, which overcomes the problems inherent in the prior art, to provide a method of detecting an ink residual quantity in an ink jet printer, which is capable of eliminating a possibility of blank printing when effecting a print on the large-sized paper by detecting the ink residual quantity at a relatively high frequency and also keeping a good printing efficiency.

It is another object of the present invention to provide a method of detecting an ink residual quantity in an ink jet printer, having a carriage mounted with an ink jet head and an ink tank, for effecting a print by reciprocating the carriage in a main scan direction, the method comprising the step of detecting the ink residual quantity in an equispeed motion area of the carriage.

According to the present invention having the above-mentioned construction, the ink residual quantity can be detected per line with a stability without stopping the carriage or incorporating a special liquid level oscillation preventive mechanism.

BRIEF DESCRIPTION OF THE DRAWINGS

Other objects and advantages of the present invention will become apparent during the following discussion taken in conjunction with the accompanying drawings, in which.

DETAILED DESCRIPTION OF THE PREFERRED EMBODIMENT

An illustrative embodiment of the present invention will hereinafter be described with reference to the drawings.

Figure 1:
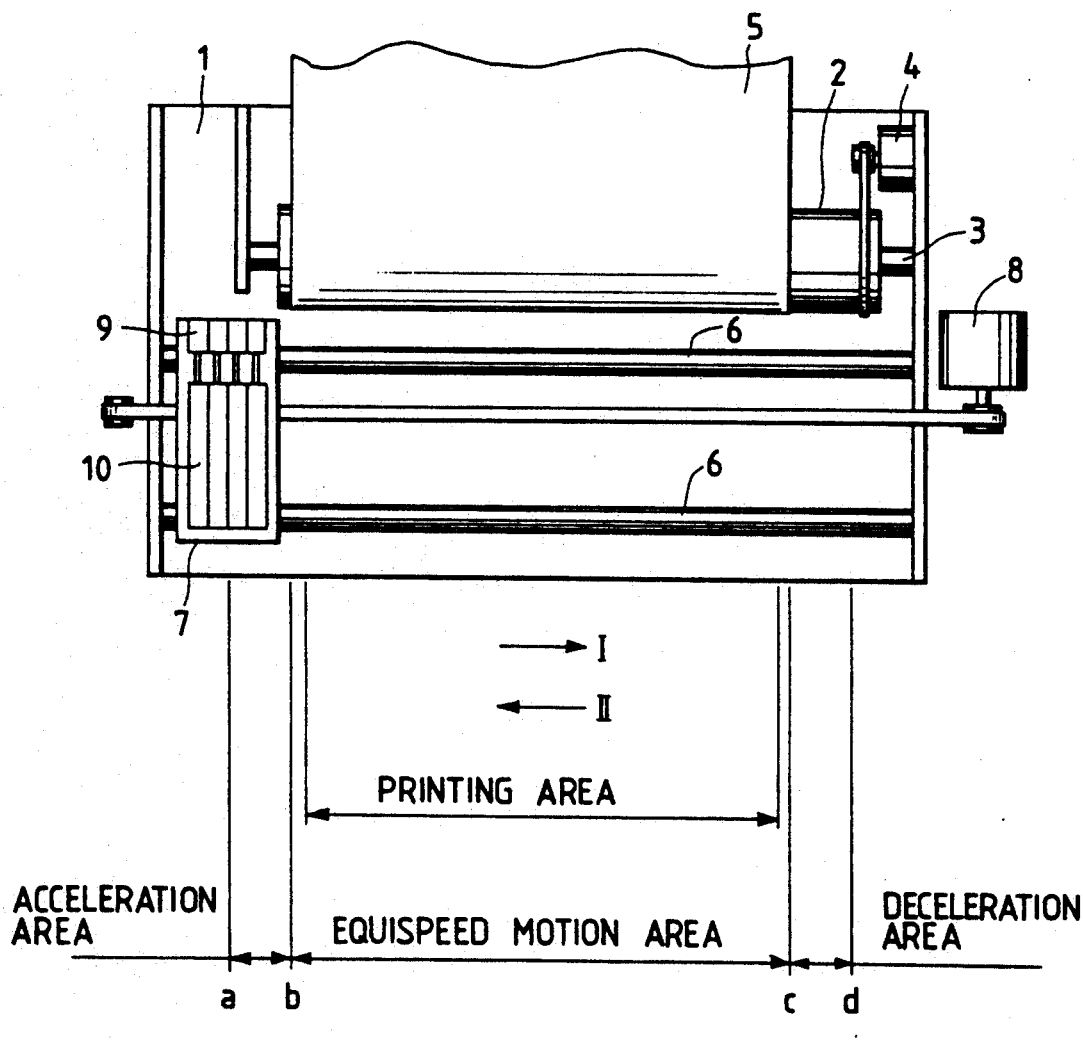
FIG. 1 is an entire plan view showing an embodiment of an ink jet printer to which an ink residual quantity detecting method according to the present invention is applied.

FIG. 1 is a plan view showing the whole of an embodiment of an ink jet printer to which an ink residual quantity detecting method of this invention is applied.

Referring to FIG. 1, a cylindrical platen 2 is rotatably supported on a printer body through a rotary shaft 3 extending in the horizontal direction. This platen 2 is rotationally driven by a motor 4, whereby paper 5 wound on an outer periphery thereof is carried in a subscan direction.

The printer body 1 in front of the platen 2 is mounted with a pair of carriage shafts 6, 6 each parallel to the rotary shaft 3. A carriage 7 is so supported on these two carriage shafts 6, 6 as to be possible of reciprocations along the platen 2. Then, the carriage 7 is reciprocated in a main scan direction along the platen 2 by means of a motor 8 rotationally drivable in forward and reverse directions.

The carriage 7 is mounted with ink jet heads 9 for effecting a print by jetting inks on the paper 5 and ink tanks 10. In accordance with this embodiment, the ink involves the use of four colors such as cyan, magenta, yellow and black. The ink tanks and the printing heads 9 are provided by fours corresponding to the respective inks.

Figure 2:
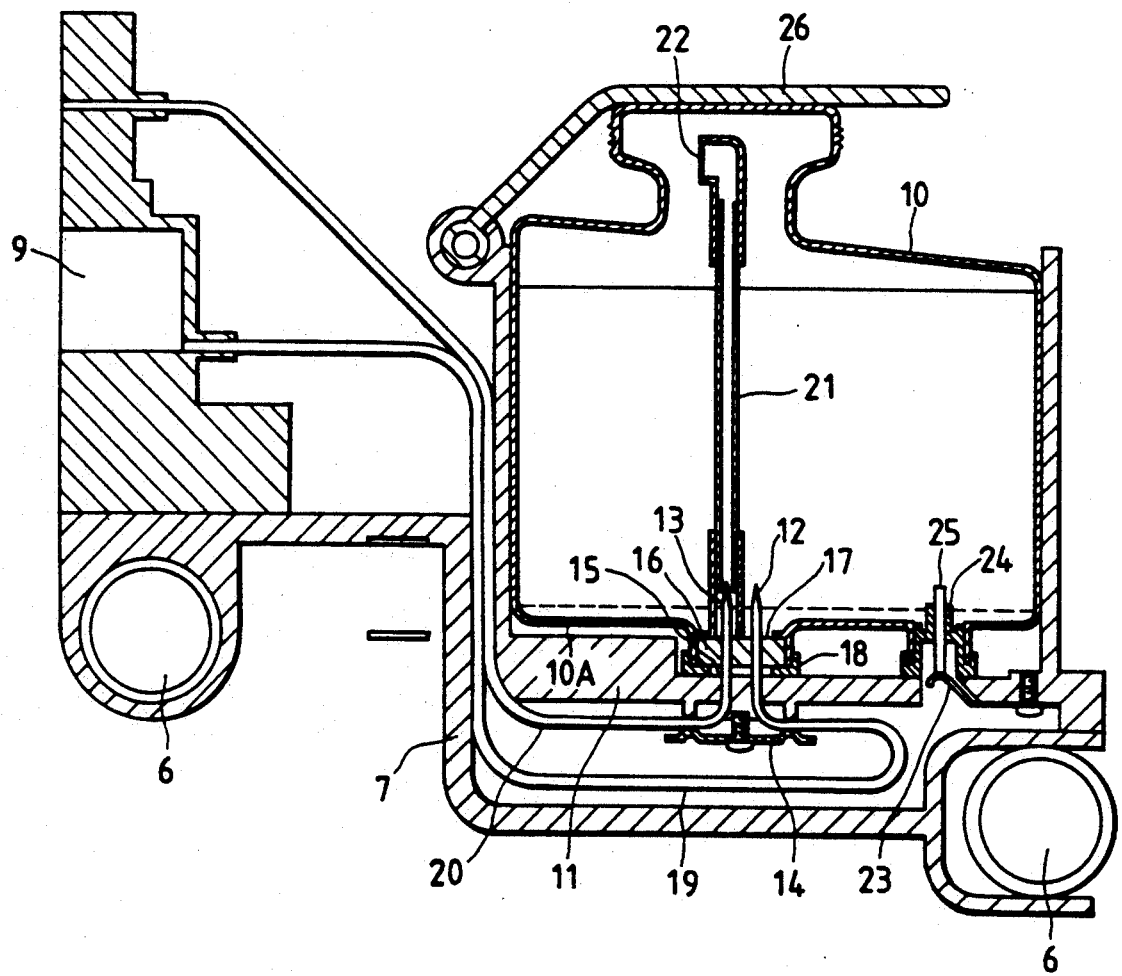
FIG. 2 is a sectional view illustrating a state where an ink tank is mounted in the vicinity of a carriage of FIG. 1.
Figure 3:
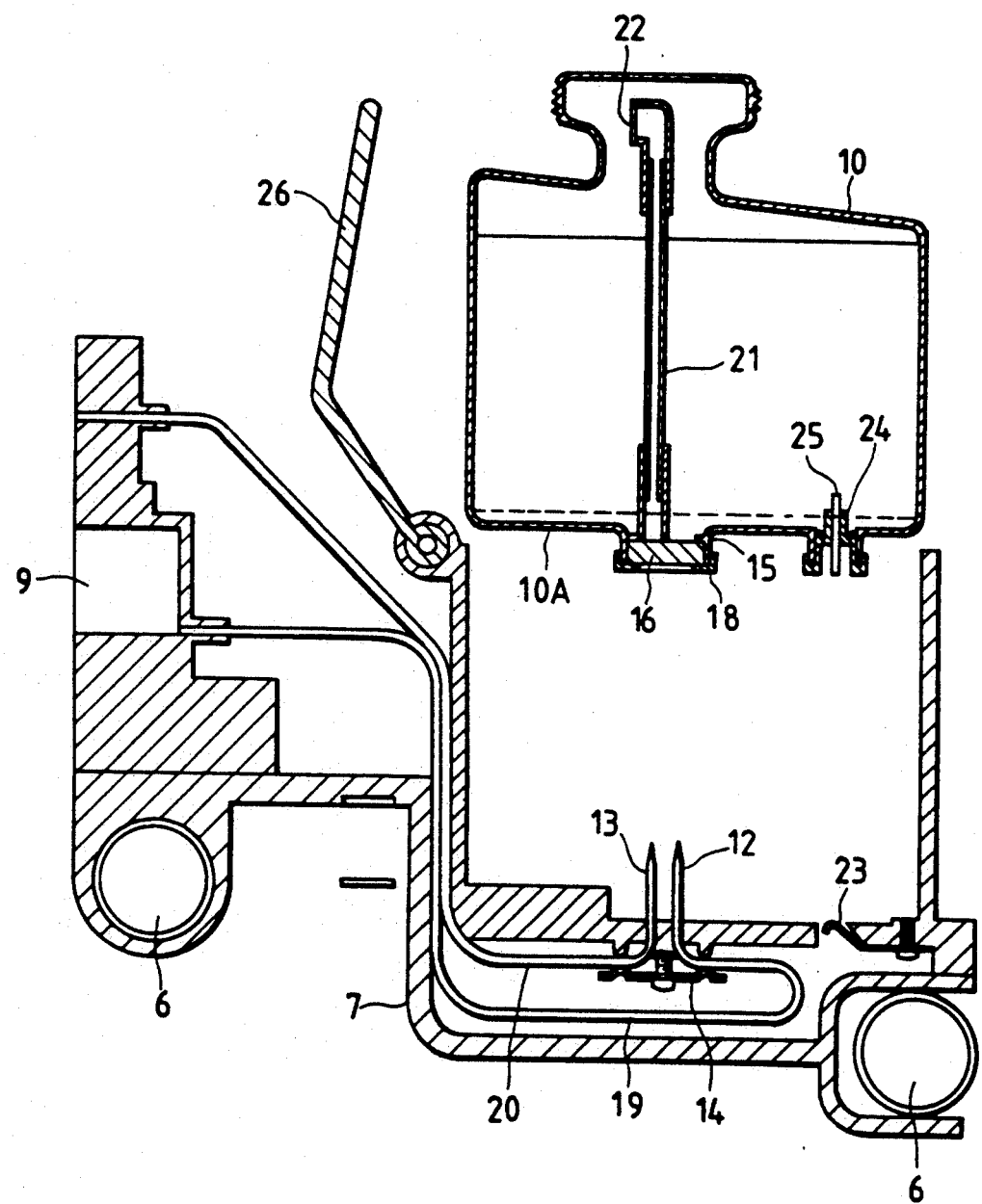
FIG. 3 is a sectional view illustrating a state where the ink tank vicinal to the carriage is mounted.

FIGS. 2 and 3 are sectional views illustrating a vicinity of the carriage 7. FIG. 2 illustrates a state where the ink tank 10 for replacement is mounted. FIG. 3 depicts a state where the ink tank 10 is demounted.

Referring to FIGS. 2 and 3, the carriage 7 is fitted with a holder for holding the ink tank 10. Attached to this holder 11 are an ink supply needle 12 and an air supply needle 13 each made of a conductive material in such a way that the needles are in point-contact with a metal plate 14 fixed to the holder 11 to absorb scatters in bending angles of the respective needles 12, 13. Note that the needles 12, 13 are electrically conductive to the metal plate 14.

A bottom wall 10A of the ink tank 10 placed on the holder 11 is formed with an annular projection 15 communicating with the interior. Provided in an interior of this annular projection 15 is a rubber plug admitting penetrations of the ink supply needle 12 and the air supply needle 13 and also capable of preventing a leakage of the ink in the ink tank 10. Note that if an additive or the like of this rubber plug 16 is dissolved in the ink, there exists a possibility to deteriorate the performance of the ink jet head 9, and hence the upper surface of the rubber plug 16 is coated with a thin film 17 breakable by the needles 12, 13 to thereby prevent the rubber plug 16 from being wetted by an unused ink. Further, the annular projection 15 is covered with a cap 18.

An ink supply tube 19 led to the ink jet head 9 is connected to the ink supply needle 12. Further, an air supply tube 20 led to an unillustrated air supply means is connected also to the air supply needle 13.

Disposed upwardly of the portion of the rubber plug 16 through which the air supply needle 13 passes is a conduit pipe 21 for guiding the air supplied into the ink tank 10 via the air supply needle 13 to an upper edge inside the ink tank 10 so that the same pipe extends in the vertical direction. A liquid-waste filter 22 is fitted to an upper end of this conduit pipe 21, thereby preventing an infiltration of the ink into the conduit pipe 21.

A metal leaf spring 23 is attached to the holder 11. On the other hand, a plug member 24 composed of an insulating material is formed on the bottom wall 10A of the ink tank 10. Fitted to this plug member 24 is an electrode pin 25 extending inwardly outwardly of the ink tank 10. Then, this electrode pin 25 contacts the leaf spring 23 when mounting the ink tank 10 on the holder 11.

It is to be noted that a safety cover 26 for preventing human fingers from touching on the respective needles 12, 13 is so provided as to be biased downwards by an unillustrated spring. In accordance with this embodiment, the safety covers 26 and the springs are independently attached by fours corresponding to the respective colors.

Figure 4:
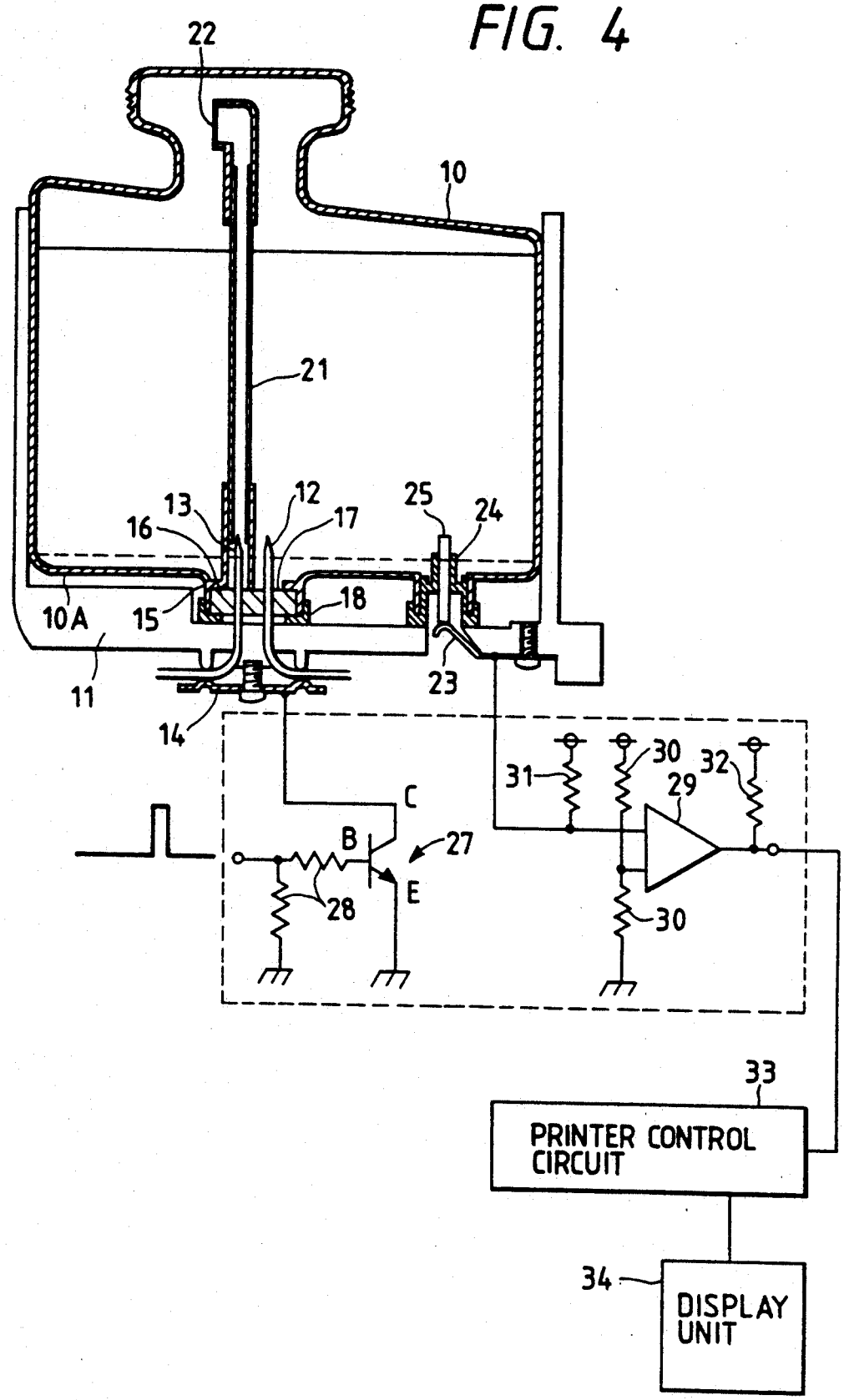
FIG. 4 is a block diagram depicting an ink residual quantity detecting device for embodying the ink residual quantity detecting method of this invention.

FIG. 4 is a block diagram illustrating an ink residual quantity detecting device for embodying the ink residual detecting method according to the present invention. This ink residual quantity detecting device detects variations in electric resistance between the ink supply needle 12 and the electrode pin 25 due to the residual quantity of the ink within the ink tank 10.

The ink residual quantity detecting device includes a transistor 27, a collector C of which is connected to the metal plate 14. Further, a bias resistor 28 is connected to a base B of this transistor 27.

In addition, the ink residual quantity detecting device has a comparator 29. A pair of voltage-dividing resistors 30, 30 for a reference value are connected to a reference input signal side of this comparator 29. On the other hand, a measurement input signal side of the comparator 29 is connected to the leaf spring 23. A voltage-dividing resistor 31 for measurement is connected to this measurement input signal side.

An output compensation resistor 32 is connected to an output of the comparator 29. Connected further to this output is a printer control circuit 33 for controlling the whole ink jet printer. Then, when the ink has been consumed to such an extent that a liquid level of the ink within the ink tank 10 is a constant value or under, and when the electric resistance between the ink supply needle 12 and the electrode pin 25 exceeds a threshold value, the output of the comparator is switched over. As a consequence, the printer control circuit 33 temporarily stops the operation of the printer. Besides, a display unit 34 for informing the user of an ink exhaustion is connected to this printer control circuit 33.

Next, the operation of the thus constructed embodiment will be explained.

Printing is performed alternately by carrying the paper 5 with rotations of the platen upon driving the motor 4 and by jetting the inks on the paper 5 from the ink jet heads 9 mounted on the carriage 7 while moving the carriage 7 upon driving the motor 8.

During turnabouts of the carriage 7 in the right-and-left directions in the printing stroke, the carriage 7 has to stop one time at the end of the stroke of the carriage 7. Besides, if the carriage 7 is not moved at a predetermined printing speed during printing, a printing efficiency decreases. Hence, the carriage 7 has to be accelerated or decelerated at the end of the printing stroke of the of the carriage 7. For this reason, the acceleration acts on the carriage 7.

This state is demonstrated by FIG. 1. An a-d range in FIG. 1 is a printing stroke of the carriage 7. When moving the carriage 7 in an arrowed direction I of the FIGURE, an a-b range at the onset of motion of the carriage 7 is defined as an acceleration area. A b-c range subsequent thereto is defined as an equispeed area. Further, a c-d range just before the turnabout is defined as a deceleration area. Note that a printing area where printing is actually performed is within the equispeed area. Further, when moving the carriage 7 in an arrowed direction II of the FIGURE which is opposite to the arrowed direction I, the d-c range at the onset of motion of the carriage 7 serves as the acceleration area. The c-b area subsequent thereto serves as the equispeed area. Further, the b-a range just before the turnabout serves as the deceleration area.

The acceleration acts on the carriage 7 in the acceleration and deceleration areas of the carriage 7. Therefore, the ink in the ink tank mounted on the carriage 7 sways. This sway of the ink ends immediately when the carriage 7 starts making the equispeed motion.

Then, in accordance with this embodiment, every time the carriage moves in one direction, and during the equispeed motion of the carriage 7, a residual quantity of the ink within the ink tank 10 is detected. The ink residual quantity is detected concretely in a printing end position inwardly vicinal to the point c just before the deceleration in the case of printing in the arrowed direction I. The detection is also effected in a printing end position inwardly vicinal to the point b similarly just before the deceleration in the case of printing in the arrowed direction II.

Next, the ink residual quantity detecting method will be explained by way of a concrete example.

To start with, the number of printing pulses is counted to find out the ink residual quantity detecting positions, i.e., the printing end positions inwardly vicinal to the points b, c. The positions inwardly vicinal to b, c are thus detected. Then, when carriage 7 reaches to this position, a short-time bias current on the order of 500 $\mu$s flows to the base B of the transistor 27 shown in FIG. 4 at this point of time. The current is thereby flowed to the ink within the ink tank 10 via the voltage-dividing resistor 31. Just then, the output of the comparator 29 is switched over depending on whether the residual quantity of the ink within the ink tank 10 is large or small. Therefore, when the output of the comparator 29 is switched over with a reduction in the residual quantity of the ink within the ink tank 10, the printer control circuit 33 temporarily stops the operation of the printer. Simultaneously, the display unit 34 informs the user of the ink exhaustion. Accordingly, there is no possibility wherein printing continues while the ink has been consumed up.

As described above, in accordance with this embodiment, the ink residual quantity is detected every time the carriage 7 moves in each direction during the printing process. Unlike the conventional detection of the ink residual quantity per page, there is no possibility in which printing continues in the as-exhausted state of the ink. Further, the ink residual quantity is detected during the equispeed motion of the carriage 7, with the result that the ink does not sway. It is therefore feasible to accurately detect the residual quantity. Moreover, an electrifying time to the ink is extremely short, and hence there exists no possibility in which the ink undergoes electrolysis.

It should be noted that the present invention is not limited to the embodiment discussed above, and a variety of modifications may be effected as the necessity arises. For instance, according to the present invention, the ink residual quantity is detected in the carriage equispeed motion area. However, even when entering somewhat the carriage accelerating or decelerating motion area, and if the detection is done before causing the sway of the ink, this is, as a matter of course, included in the technical scope of the present invention. Further, as a timing of detecting the ink residual quantity, the quantity may be detected not at every carriage movement in each direction but at every carriage reciprocation; or alternatively, the detection may be effected every time a plurality of movements are performed.

As discussed above, according to the present invention, the ink residual quantity is detectable after attenuating the oscillations of the liquid level of the ink during the bilateral turnabouts of the carriage. Hence, it is possible to stably detect the ink residual quantity per line without temporarily stopping the carriage or adding a special liquid level oscillation preventive mechanism.

What is claimed is:

1. A method of detecting an ink residual quantity within an ink tank in an ink jet printer having a carriage mounted with an ink jet head and said ink tank, for effecting a print by moving said carriage in printing strokes, each of said printing strokes including an equispeed motion portion and an acceleration portion, said ink jet printer further having ink residual quantity detecting means for detecting the quantity of ink remaining in said ink tank, said method comprising the step of:

causing said ink residual quantity detecting means to perform the detection only during said equispeed motion portion of one of said printing strokes.

2. The method as claimed in claim 1, wherein said printing strokes further include a deceleration portion following said equispeed motion portion, and said detection performed by said residual ink quantity detecting means is conducted immediately before a start of said deceleration portion.

3. The method as claimed in claim 1, wherein said carriage reciprocates for effecting printing in a forward direction and a reverse direction, and wherein the ink residual quantity is detected every time said carriage moves along said forward direction and every time said carriage moves along said reverse direction.

4. The method as claimed in claim 1, wherein the ink residual quantity is detected once per each of said printing stroke.

5. The method as claimed in claim 1, wherein the ink residual quantity is detected less frequently than once during each of said printing strokes.

6. A method of detecting an ink residual quantity within an ink tank in an ink jet printer, having a carriage mounted with an ink jet head and said ink tank, for effecting a print by moving said carriage in printing strokes, each of said printing strokes including an equispeed motion portion and an acceleration portion, said ink jet printer further having ink residual quantity detecting means for detecting the quantity of ink remaining in said ink tank by causing an electric current to flow through said ink in said ink tank, said method comprising the step of:

causing said electric current to flow through said ink to make said ink residual quantity detecting means perform the detection, only during said equispeed motion portion of one of said printing strokes.

* * * * *